(12) United States Patent
Peng et al.

(10) Patent No.: US 6,947,628 B1
(45) Date of Patent: Sep. 20, 2005

(54) DYNAMIC WAVELENGTH-SELECTIVE OPTICAL ADD-DROP SWITCHES

(75) Inventors: Song Peng, Pleasanton, CA (US); Ming Li, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 189 days.

(21) Appl. No.: 10/231,407

(22) Filed: Aug. 28, 2002

Related U.S. Application Data

(60) Provisional application No. 60/316,140, filed on Aug. 30, 2001.

(51) Int. Cl.[7] ................................................ G02B 6/26
(52) U.S. Cl. ............................ 385/18; 385/16; 385/15
(58) Field of Search .............................. 385/33, 15–24

(56) References Cited

U.S. PATENT DOCUMENTS

| | | | |
|---|---|---|---|
| 5,414,540 A * | 5/1995 | Patel et al. ................. | 349/196 |
| 6,097,859 A * | 8/2000 | Solgaard et al. ............... | 385/17 |
| 6,327,019 B1 * | 12/2001 | Patel et al. ................. | 349/196 |
| 6,532,318 B1 * | 3/2003 | Brophy et al. ................ | 385/17 |
| 6,560,000 B2 * | 5/2003 | Iyer et al. ................... | 359/238 |
| 6,658,212 B1 * | 12/2003 | Trutna et al. ................. | 398/84 |
| 6,707,959 B2 * | 3/2004 | Ducellier et al. ............. | 385/17 |
| 6,711,316 B2 * | 3/2004 | Ducellier ..................... | 385/17 |
| 6,760,511 B2 * | 7/2004 | Garrett et al. ................ | 385/24 |

* cited by examiner

*Primary Examiner*—Daniel Stcyr
*Assistant Examiner*—April Taylor
(74) *Attorney, Agent, or Firm*—Moser, Patterson & Sheridan, L.L.P.

(57) ABSTRACT

A wavelength-selective optical add-drop switch includes a first and a second 1×2 wavelength switch optically coupled to one another via at least one mirror. Each of the first and second 1×2 wavelength switches has a switch input and two switch outputs, a wavelength dispersive medium optically coupled to the switch input and the two switch outputs, a lens optically coupled to the wavelength dispersive medium and a segmented beam steering apparatus optically coupled to the lens opposite to the wavelength dispersive medium. The add-drop wavelength switch has a high extinction ratio and low loss.

9 Claims, 10 Drawing Sheets

DYNAMIC WAVELENGTH-SELECTIVE OPTICAL ADD-DROP SWITCHES

CROSS-REFERENCE TO RELATED APPLICATIONS

This application claims priority under 35 U.S.C. §119(e) the benefit of U.S. Provisional Patent Application No. 60/316,140, titled "Dynamic Wavelength-Selective Optical Add-Drop Switches," filed on Aug. 30, 2001.

FIELD OF THE INVENTION

The present invention relates to optical add-drop switches and optical add-drop multiplexers.

BACKGROUND OF THE INVENTION

In a wavelength division multiplexing optical communication system, information is carried by multiple channels, each with a distinct wavelength. It is often necessary to add or drop a wavelength channel in optical links or networks. This can be achieved by a wavelength switch that sends different wavelength channels to different locations. These switches are often termed "add-drop switches" because they extract certain channels delivered from an input port and send the extracted channels to a "drop" port whilst, simultaneously, they receive certain replacement channels from an "add" port and send these added channels to an output port. The non-dropped or through-going channels originally from the input port, herein referred to as "express" channels, are also sent to the output port. Such add-drop switches are also referred to as "add-drop multiplexers" because, they must combine or multiplex channels as part of their channel adding operation.

FIG. 4 is a schematic diagram of the architecture of a conventional optical add-drop switch 400, wherein the added channels are de-multiplexed upon entering the apparatus and wherein the removed channels are multiplexed upon exiting the apparatus. The conventional optical add-drop switch 400 comprises an input port 401, an output port 403, a first de-multiplexer (DEMUX) 402a optically coupled to the input port 401, a first multiplexer (MUX) 404a optically coupled to the output port 403, a plurality of 2×2 optical switches 406a–406c, optically coupled between the first DEMUX 402a and the first MUX 404a, an add port 405, a drop port 407, a second DEMUX 402b optically coupled between the add port 405 and to each of the 2×2 optical switches 406a–406c, and a second MUX 404b optically coupled between the drop port 407 and to each of the 2×2 optical switches 406a–406c.

The optical couplings 413a, 413b and 413c of the conventional optical add-drop switch 400 optically couple the first DEMUX 402a to switch inputs of the respective 2×2 optical switches 406a, 406b and 406c. The optical couplings 415a, 415b and 415c optically couple switch outputs of the 2×2 optical switches 406a, 406b and 406c, respectively, to the first MUX 404a. The optical couplings 409a, 409b and 409c optically couple the second DEMUX 402b to switch inputs of the respective 2×2 optical switches 406a, 406b and 406c. The optical couplings 411a, 411b and 411c optically couple switch outputs of the 2×2 optical switches 406a, 406b and 406c, respectively, to the second MUX 404b.

An input composite optical signal comprising a plurality of wavelength division multiplexed optical channels is input to the first DEMUX 402a from the input port 401. The first DEMUX 402a separates each of the channels to a unique respective one of the plurality of 2×2 optical switches 406a–406c via a respective one of the optical couplings 413a–413c. Further, an add-port composite optical signal comprising a plurality of wavelength division multiplexed optical channels is delivered to the second DEMUX 402b from the add port 405, wherein the wavelengths of the add-port composite optical signal are a subset of the wavelengths of the input composite optical signal. The second DEMUX 402b separates each of these added channels to a unique respective one of the plurality of 2×2 optical switches 406a–406c via a respective one of the optical couplings 409a–409c.

Each 2×2 optical switch 406a, 406b, 406c receives a respective channel of the input composite signal and may receive a channel of the add-port composite optical signal comprising the same wavelength as the channel of the input composite optical signal. Each 2×2 optical switch may be in either one of two states—a "cross" state or a "bar" state, for which the operation of switch 406a is utilized as an example. In the cross state, the channel from optical coupling 413a is switched to optical coupling 411a whilst the added channel from optical coupling 409a is switched to optical coupling 415a. Conversely, in the bar state, the channel from optical coupling 413a is switched to optical coupling 415a and, in general, there is no added channel from the optical coupling 409a. Therefore, when a switch is in its cross state, a channel originally from the input port 401 is directed to the second MUX 404b and thence to the drop port 407 and a replacement channel from the add port is directed to the first MUX 404a and thence to the output port 403. However, when the switch is in its bar state, there is generally no channel from the add port and the channel originally from the input port 401, which is, in this instance, termed an "express" channel, is directed to the first MUX 404a and thence to the output port 407. Therefore, the conventional optical add-drop switch 400 drops and adds channel in pairs and the adding and dropping of each wavelength is independent of the adding and dropping of every other wavelength.

The conventional add-drop switch, although capable of performing its intended function, comprises two multiplexers and two de-multiplexers as well as numerous 2×2 switches. Although only three such 2×2 switches are illustrated in FIG. 4, the conventional add-drop switch will, in general, include one such switch for each one of every possible WDM channel, which may comprise sixteen or more channels. The utilization of such a plurality of 2×2 switches yields a complex and bulky apparatus and can cause a high level of insertion loss, since extra optical components or optical couplings between components induce additional losses.

Accordingly, there exists a need for an improved optical add-drop switch. The improved switch should provide a high extinction ratio and low loss. The present invention addresses such a need.

SUMMARY OF THE INVENTION

An add-drop wavelength switch in accordance with the present invention has a high extinction ratio and low loss. A preferred embodiment of an add-drop wavelength switch in accordance with the present invention comprises a first and a second 1×2 wavelength switch optically coupled to one another via at least one mirror, wherein each of the first and second 1×2 wavelength switches comprises a switch input and two switch outputs, a wavelength dispersive medium optically coupled to the switch input and the two switch outputs, a lens optically coupled to the wavelength dispersive medium and a segmented beam steering apparatus optically coupled to the lens opposite to the wavelength dispersive medium.

In a first preferred embodiment of an add-drop wavelength switch in accordance with the present invention, the segmented beam steering apparatus comprises a reflective apparatus that includes a plurality of elements, each element comprising an independently moveable reflective segment. In a second preferred embodiment of an add-drop wavelength switch in accordance with the present invention, the segmented beam steering apparatus comprises a polarization steering device, where each segment includes a polarization modulator, a birefringent polarization beam displacer and an angled reflector.

The first 1×2 wavelength switch receives a composite optical signal at a first port and independently directs each channel to either a drop port or a second port depending upon the configurations of the segments of the segmented beam steering apparatus. The first 1×2 wavelength switch multiplexes the removed channels and delivers these removed channels to the drop port. The second port of the first 1×2 wavelength switch is optically coupled to a first port of the second 1×2 wavelength switch via the at least one mirror and receives the non-dropped channels from the first 1×2 wavelength switch. An add port of the second 1×2 wavelength switch receives the added or replacement channels such that the added channels are multiplexed together with the non-dropped channels within the second 1×2 wavelength switch and are output via a second port of the second 1×2 wavelength switch.

Exemplary embodiments of the present invention may use one or more of the aspects described above, alone, or in combination.

DETAILED DESCRIPTION

The present invention provides an improved optical add-drop switch. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

To more particularly describe the features of the present invention, please refer to FIGS. 1–3C and 5–7 in conjunction with the discussion below.

Figure 1:
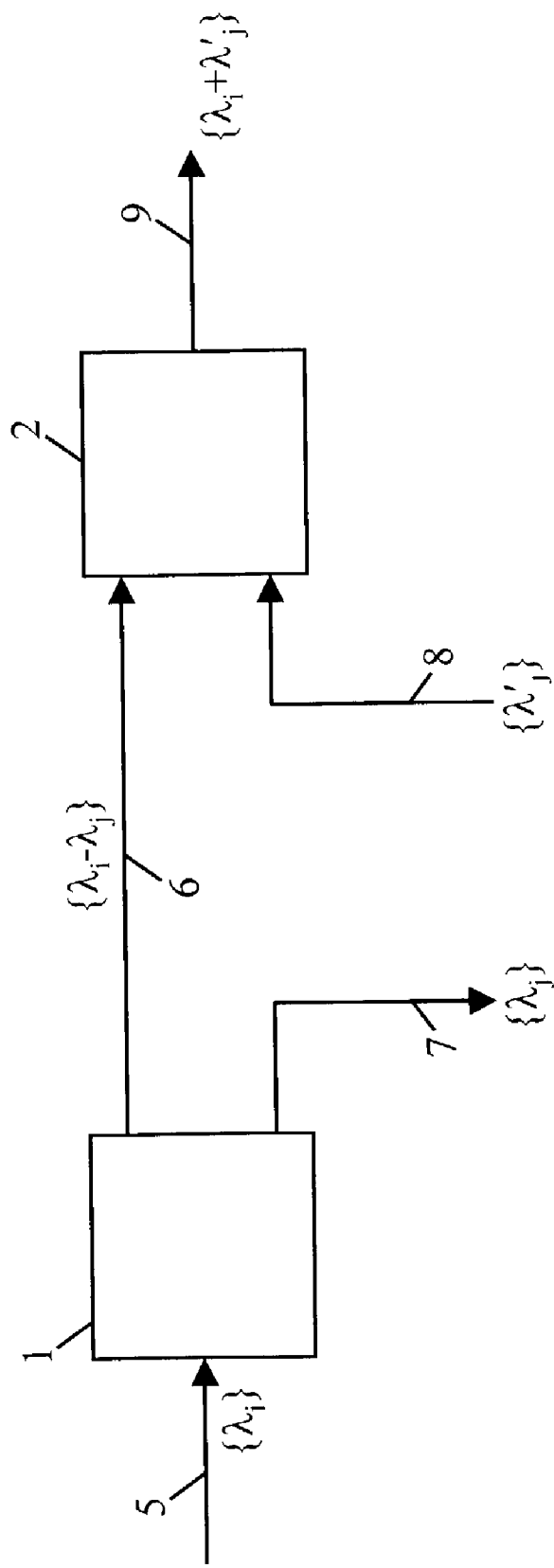
FIG. 1 is a schematic diagram of how two 1×2 wavelength switches may be combined to form an add-drop wavelength switch.

FIG. 1 shows a schematic diagram of combining two 1×2 wavelength switches to form an add-drop wavelength switch. One of the output ports of the first switch 1 is used as the drop port 7. The other output port 6 is linked to one of the output ports of the second switch 2. The other output port of switch 2 is used as an add port 8 and the input port 9 is utilized, in reverse, to output the combined channels (for this to work, switch 2 must be bi-directional, since the output ports are used to receive channels and the input port 9 is used to output channels). To perform proper add-drop functions, the two switches must be set at same switching states. FIG. 1 shows that a subset $\{\lambda_j\}$ of the wavelengths can be dropped at the drop port 7, whilst another set of channels $\{\lambda'_j\}$, comprising the same wavelengths as, but different signals than, the dropped channels, are added at the add port 8.

There are several advantages of using two 1×2 switches to form an add-drop switch. Assume each 1×2 switch has an extinction ratio of −40 dB, there will be only −80 dB of dropped wavelengths that can pass through to the output 9. This means that one can drop a wavelength cleanly. The other advantage is that there's essentially no cross talk between add and drop ports.

Figure 2A:
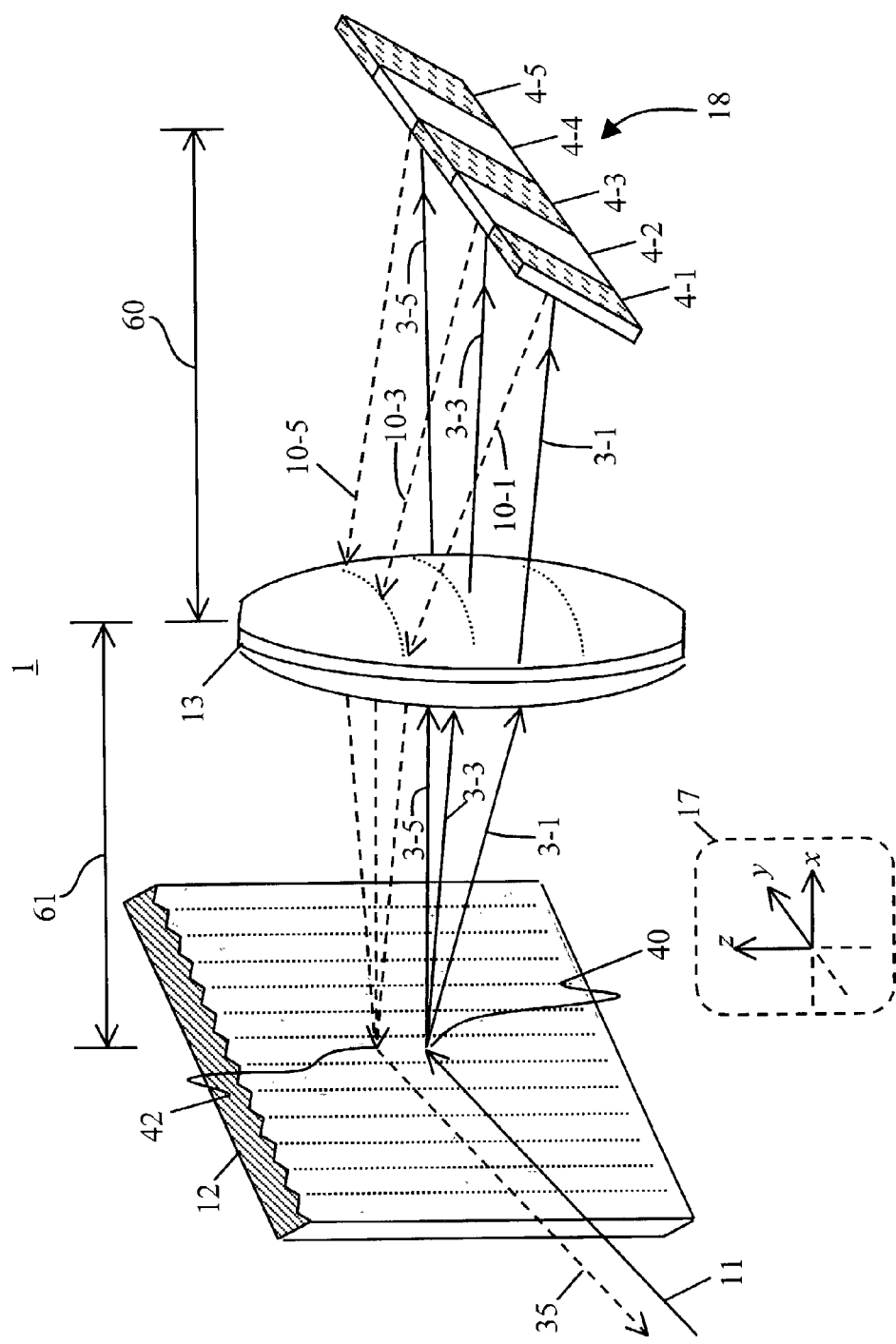
FIG. 2A is an illustration of a first 1×2 wavelength selective switch showing the pathways of a first set of optical channels to a first output.
Figure 2B:
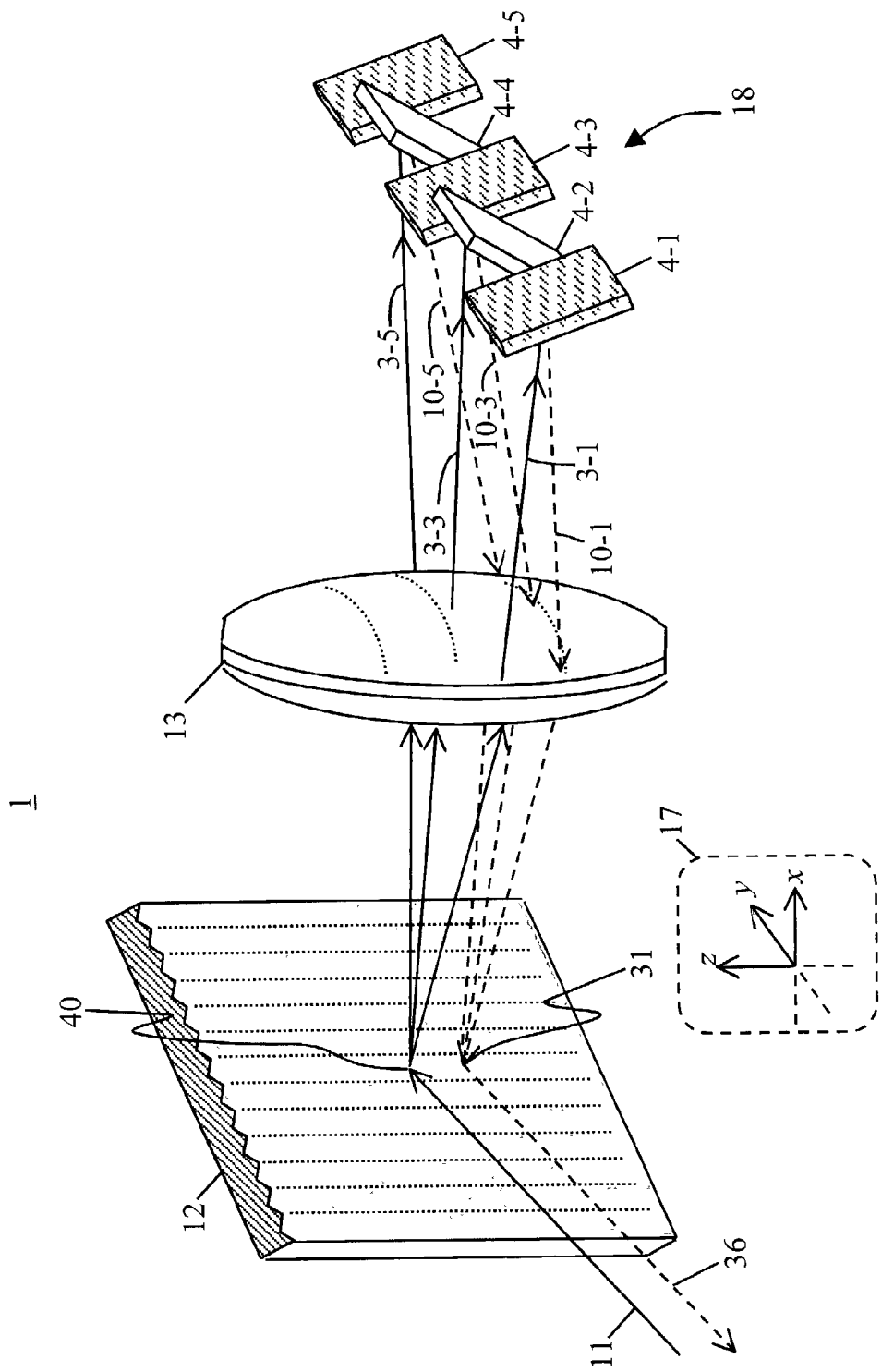
FIG. 2B is another illustration of the 1×2 wavelength selective switch of FIG. 2A, showing the pathways of a second set of optical channels to a second output.

As an example, FIGS. 2A–2B illustrate a 1×2 wavelength selective switch that has been disclosed in a co-pending U.S. Application titled "An Optical Wavelength Router using Reflective Surfaces to Direct Output Signals, Ser. No. 09/794,590, filed by the same inventors on Feb. 26, 2001 and assigned to the assignee of the present application. Applicant hereby incorporates this co-pending application herein in its entirety. FIG. 2A illustrates the pathways of a first set of optical channels through the wavelength-selective switch 1 to a first output. FIG. 2B illustrates the pathways of a second set of optical channels through the same wavelength-selective switch 1 to a second output.

The 1×2 wavelength selective switch shown in FIGS. 2A–2B comprises a reflective apparatus 18, lens 13, and dispersive medium 12. Reflective apparatus 18 includes n number of pixels, each comprising an independently moveable reflective segment. In the present example, n=5 and the pixels are denoted 4-1 through 4-5 (for simplicity, the mechanical elements are not shown). Although the present example is limited to 5 pixels and, thus, five channels, the reflective apparatus 18 may comprise any number n of pixels. Pixels 4-1 through 4-5 are aligned substantially along the y-direction as defined by coordinate system 17. A single, broadband optical input signal 11 (a light beam) travels substantially in the y-direction, as defined by coordinate system 17, towards spot 40 of dispersive medium 12. Input signal 111 includes a multiplexed multi-channel set of optical signals. Dispersive medium 12 is typically a wavelength-dispersive medium, for example, a diffraction grating or a prism. Dispersive medium 12 divides input signal 11 into wavelength-separated input components 3-1 through 3-5, shown by solid lines in FIGS. 2A–2B. Each one of the multiplexed, multi-channel signals is separated into one of the wavelength-separated input components 3-1 through 3-5. The wavelength-separated input components 3-1 through 3-5 travel substantially in the x-direction as defined by coordinates 17, towards lens 13. Lens 13 focuses each of the input components 3-1 through 3-5 onto pixels 4-1 through 4-5 of reflective apparatus 18. Lens 13 may be a set of two or more lens elements. Input components 3-1 through 3-5 each strike one of the pixels 4-1 through 4-5. Therefore, the number of pixels (n, equal to 5 in this example) and the number of input components (n) are the same.

As used herein, pixel 4-$i$ refers to an arbitrary one of pixels 4-1 through 4-5 and input component 3-$i$ refers to an arbitrary one of input components 3-1 through 3-5. Pixel 4-$i$ directly or indirectly reflects input component 3-$i$ back to dispersive medium 12 in a selected direction. The wavelength-separated light beam traveling from reflective apparatus 18 back to dispersive medium 12 is referred to as output component 10-$i$, which is one of output components 10-1 through 10-5. In the 1×2 wavelength selective switch of FIGS. 2A–2B, each of pixels 4-1 through 4-5 is configured to reflect an incident input component 3-$i$ at one of at least two angles. The output components 10-1 through 10-5 travel back to lens 13. The angle at which each component 10-1 through 10-5 travels is determined by the setting of the particular pixel that directs the particular output component.

Lens 13 focuses input components 3-1 through 3-5 onto pixels 4-1 through 4-5. Also, lens 13 directs output components 10-1 through 10-5 onto dispersive medium 12. By passing through lens 13, each output component 10-1 through 10-5 is collimated. In order to achieve the collimation, lens 13 may be spaced first focal length 60 away from the plane of reflective apparatus 18. First focal length 60 is the focal length of lens 13 in the medium (e.g., air) between lens 13 and reflective apparatus 18. Lens 13 may also be spaced by second focal length 61 from dispersive medium 12. Second focal length 61 is the focal length of lens 13 in the medium between lens 13 and dispersive medium 12.

Output components, from amongst output components 10-1 through 10-5, that strike the same spot on dispersive medium 12 are directed into the same output port. The number of output ports is determined by the number of settings of pixel 4-$i$, since the setting of pixel 4-$i$ determines the direction of output component 10-$i$. The number of available settings affects the number of directions in which output component 10-$i$ can travel, which, in turn, affects the number and the position of spots on dispersive medium 12 that output components 10-1 through 10-5 pass through. The number of spots on dispersive medium 12 through which output components 10-1 through 10-5 pass is equal to the number of output ports. If each pixel 4-$i$ comprises two settings, then there are two output ports.

FIG. 2A depicts, using dashed lines, one of the two possible directions in which output components 10-1 through 10-5 can travel, assuming two possible settings for each pixel. FIG. 2B depicts, also using dashed lines, the other one of the two possible directions in which output components 10-1 through 10-5 can travel. When reflective apparatus 4-$i$ is set to reflect output components 10-$i$ in the direction indicated in FIG. 2A, the output component 10-$i$ is directed by lens 13 onto spot 42 of dispersive medium 12. Output components reflected by other pixels in the direction indicated in FIG. 2A are also directed onto spot 42, and are then directed into the first output port 35. Similarly, pixels 4-1 through 4-5 can each be set to reflect an incident input component 3-1 through 3-5 in the direction shown by the dashed lines in FIG. 2B. The output components 10-1 through 10-5 traveling in the direction of the dashed lines in FIG. 2B are directed by lens 13 onto spot 31 of dispersive medium 12. From spot 31, output components travel toward second output port 36.

Among the n number of micro-mirror pixels that are included in the 1×2 wavelength-selective switch 1, some micro-mirror pixels may be configured as shown in FIG. 2A, whilst others are configured as shown in FIG. 2B. Thus, in general, some output channels will be directed to output port 35 (FIG. 2A), while, at the same time, other output channels will be directed to output port 36 (FIG. 2B). In FIG. 2A, the mirror pixels 4-1, 4-3 and 4-5 (shaded) are shown disposed so as to deflect the three output components 10-1, 10-3 and 10-5, comprising the wavelengths $\lambda_1$, $\lambda_3$ and $\lambda_5$, respectively, to spot 42 and thence to output port 35. In FIG. 2B, the mirror pixels 4-2 and 4—4 (un-shaded) are shown disposed so as to deflect the two output components 10-2 and 10-4, comprising the wavelengths $\lambda_2$ and $\lambda_4$, respectively, to spot 31 and thence to output port 36. These different deflections, although illustrated in two different figures for clarity, generally occur simultaneously. Furthermore, it is apparent that, since the switch 1 utilizes components—grating, lens, mirrors—that do not exhibit any preference with regard to direction of light propagation through them, the switch 1 is bi-directional. Therefore, the same components in switch 1 may also be utilized in the apparatus 2, as shown in FIG. 1.

Figure 3A:
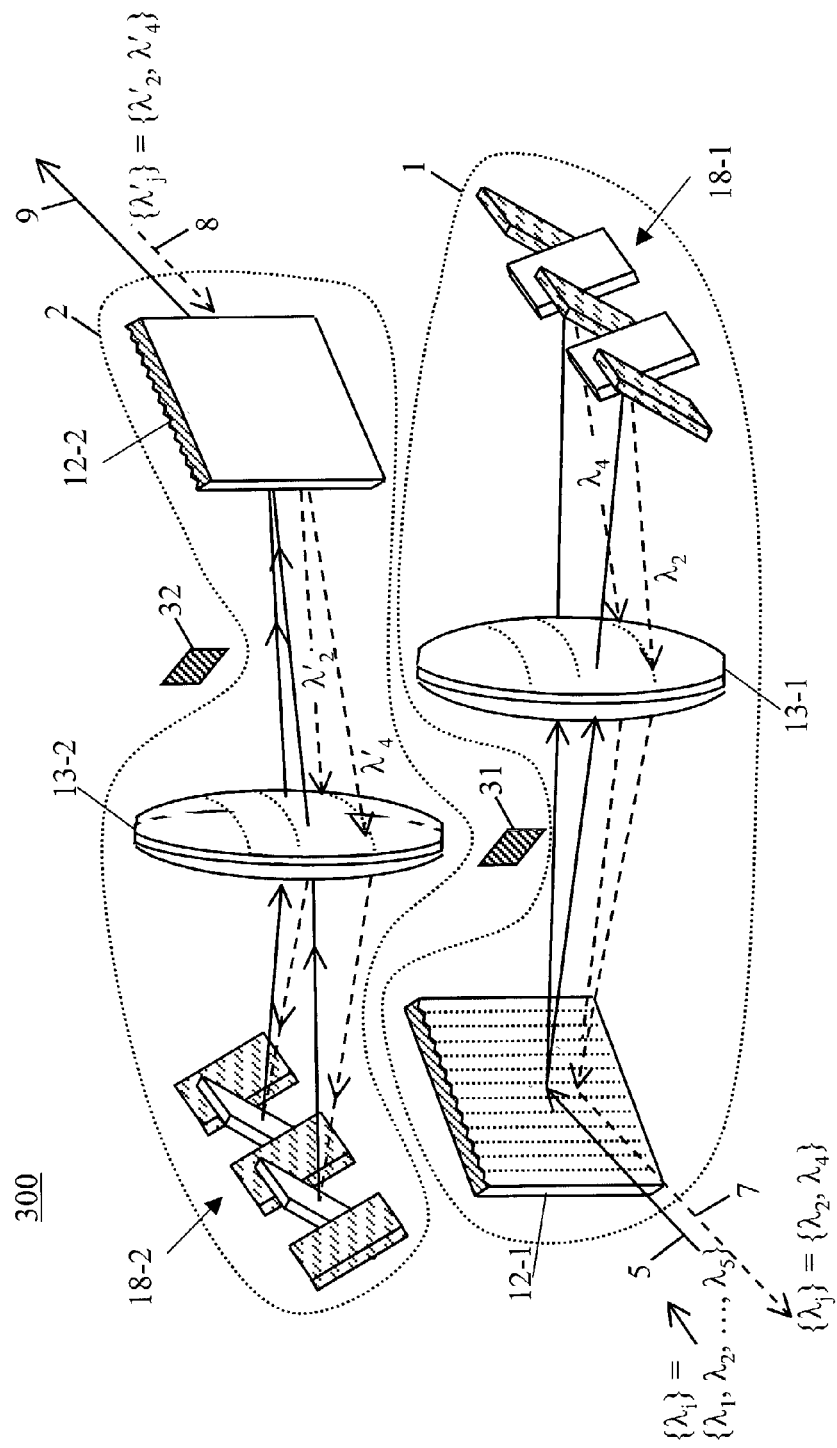
FIGS. 3A–3C are diagrams of a first preferred embodiment of a wavelength-selective optical add-drop switch in accordance with the present invention.
Figure 3B:
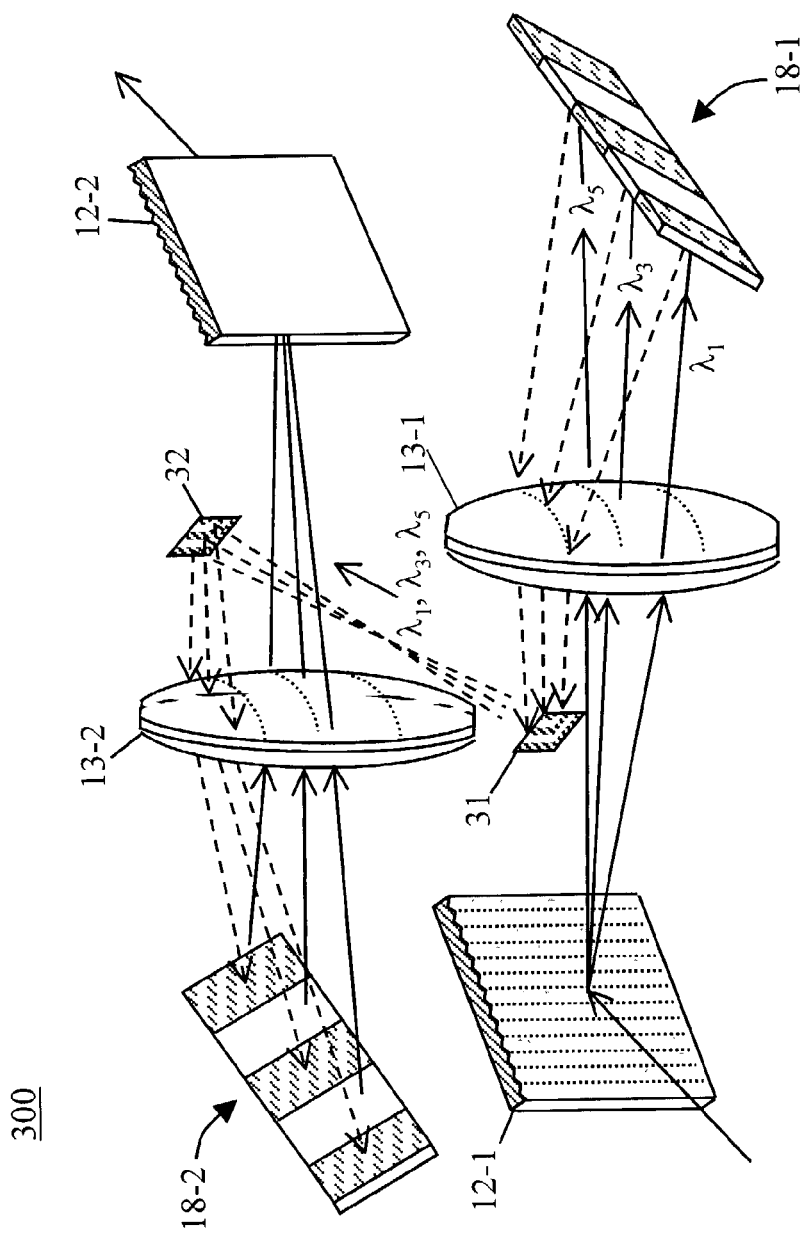
Figure 3C:
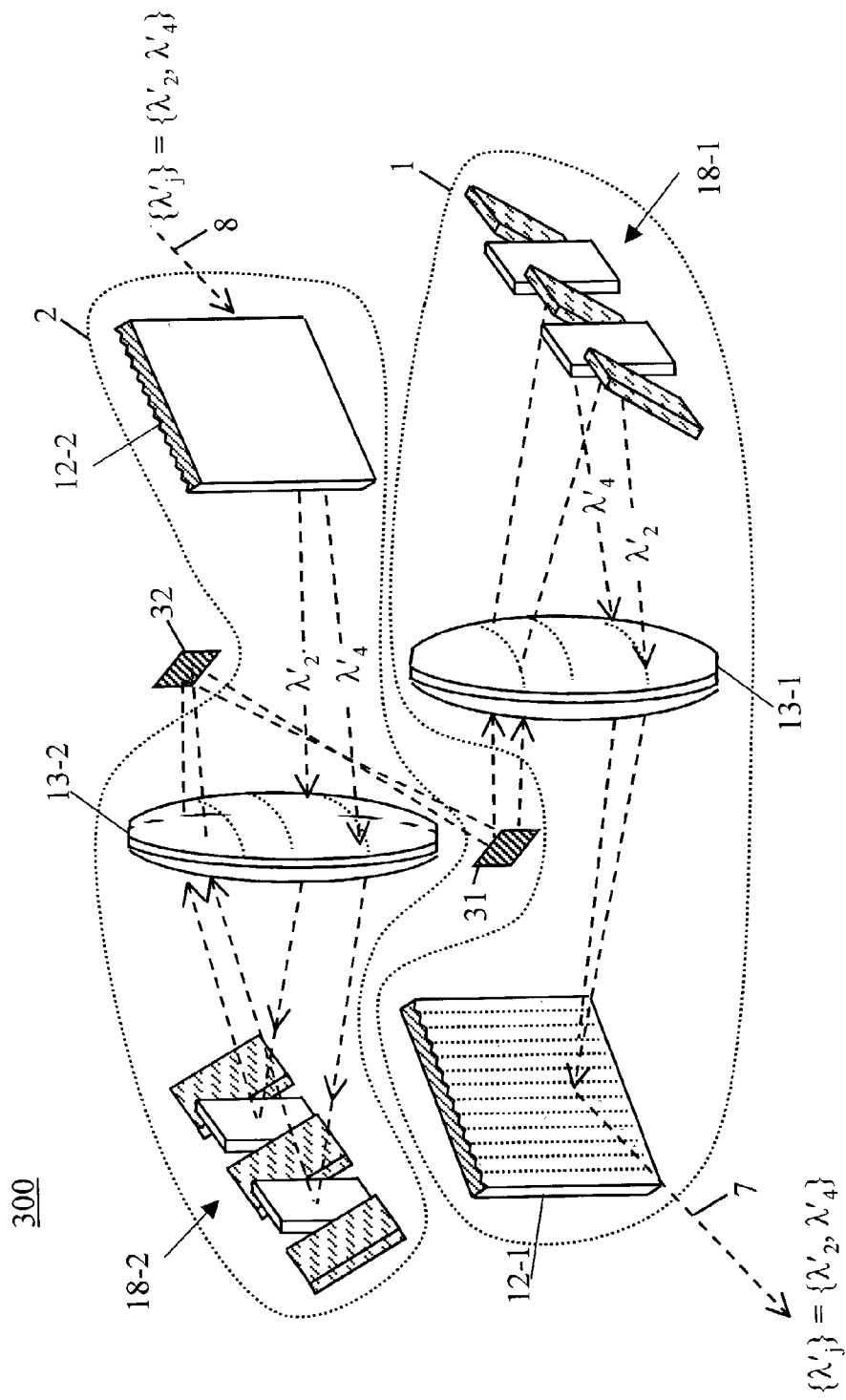
Figure 4:
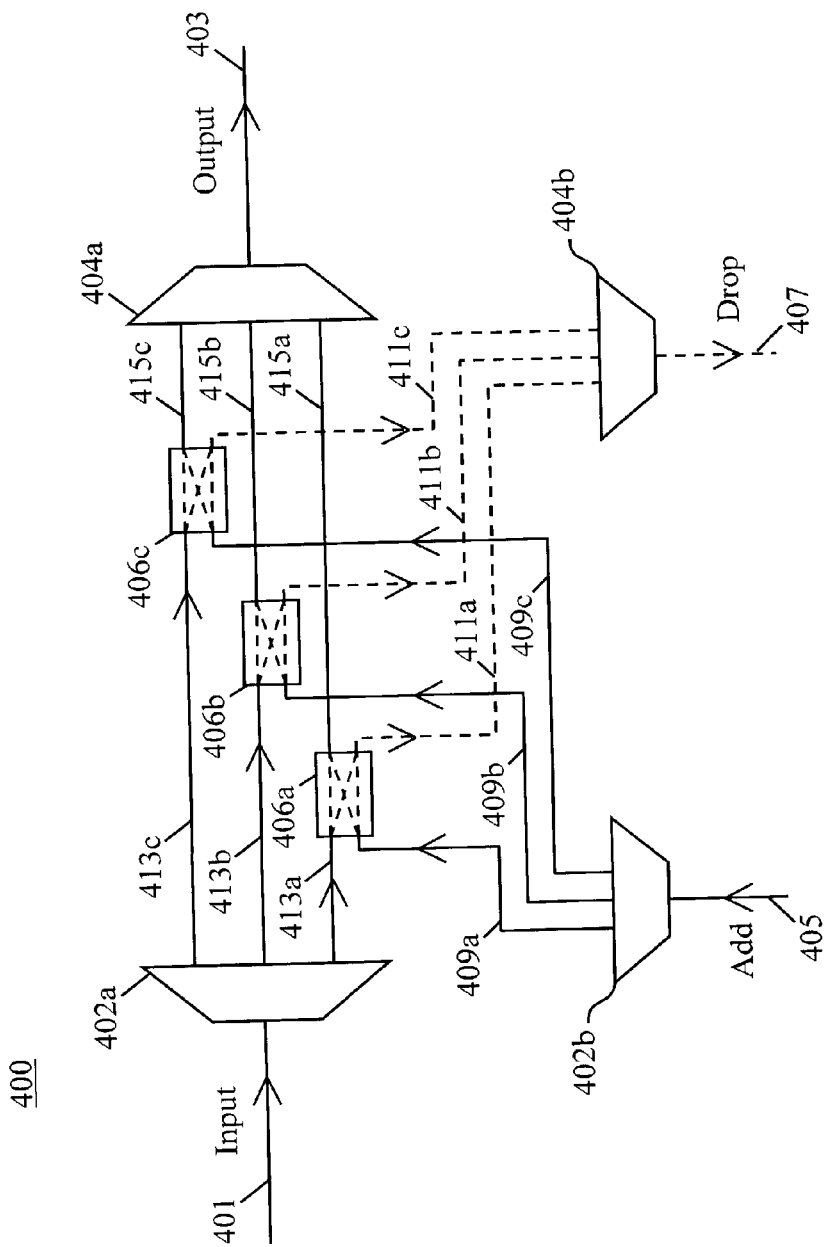
FIG. 4 is a schematic diagram of the architecture of a conventional optical add-drop switch.

FIGS. 3A–3C are diagrams of a preferred embodiment of a wavelength-selective optical add-drop switch in accordance with the present invention. The wavelength-selective optical add-drop switch 300 shown in FIGS. 3A–3C comprises a link between two of the 1×2 wavelength selective switches illustrated in FIGS. 2A–2B, with the linkage being as described in FIG. 1, to form an add-drop wavelength switch. To minimize insertion loss, the wavelength-selective optical add-drop switch 300 internally couples two 1×2 wavelength selective switches so that no light path encounters diffraction gratings more than twice. Because diffraction gratings are usually the most "lossy" components in the switches, the structure illustrated in FIGS. 3A–3C can significantly reduce insertion loss.

Once the operation of the 1×2 wavelength selective switch 1 (and, equivalently, the 1×2 wavelength selective switch 2) is understood, the operation principle of the optical add-drop switch 300 is readily described: the two mirrors 31 and 32 optically couple the upper output port of each switch. In other words, as shown in FIG. 3B, the mirror 31 intercepts the lights or channels that would otherwise (in the absence of mirror 31) travel to the spot 42 upon the grating 12-1 of switch 1 and diverts these lights to the mirror 32. In the example shown in FIG. 3B, the wavelength channels $\lambda_1$, $\lambda_3$, and $\lambda_5$ are diverted in this fashion.

The mirror 32 and the switch 2 are symmetrically disposed with relation the mirror 31 and switch 1 within the wavelength-selective optical add-drop switch 300. Therefore, the lights impinging upon mirror 32 are reflected by mirror 32 onto pathways that are coincident with those that would occur if light were traveling (in the absence of mirror 32) from the spot 42 of switch 2 through the lens 13-2 of switch 2 to the reflective apparatus 18-2 of switch 2. Since the switch 2 is essentially identical to the switch 1 except that lights propagate in opposite directions from those in switch 1, the mirror pixels of reflective apparatus 18-2 of switch 2 reflect the lights traveling from mirror 32 back through the lens 13-2 and to the grating 12-2 of switch 2. The grating 12-2 of switch 2 then combines or multiplexes these lights so that they are output from the apparatus 300 to the port 9. The channels propagating along this path from switch 1 to mirror 31 to mirror 32 to switch 2, which are exemplified by channels $\lambda_1$, $\lambda_3$ and $\lambda_5$ in FIG. 3B, comprise the non-dropped "express" channels.

The lower output port 36 of the first switch 1 (FIG. 2B) becomes the drop port 7 (FIG. 3A) within the wavelength-selective optical add-drop switch 300. Likewise, the lower output port of the other switch 2 becomes the add port 8 (FIG. 3A) within the wavelength-selective optical add-drop switch 300.

FIG. 3C illustrates a third possible channel routing through the wavelength-selective optical add-drop switch 300. In the routing configuration shown in FIG. 3C, one or more pixels (unshaded) comprising the micro-mirror array reflective apparatus 18-2 of the second switch 2 are disposed at a third possible orientation so as to reflect channels $\{\lambda'_j\}$ from the add port 8 upward so that they are intercepted by the mirror 32 and are then reflected to the mirror 31. In the example shown in FIG. 3C, the channels $\lambda'_2$ and $\lambda'_4$ are reflected in this fashion. Also, pixels comprising the micro-mirror array reflective apparatus 18-1 for the first switch 1 are oriented so as to reflect the channels $\{\lambda'_j\}$ received from the mirror 31 downward so that they exit the apparatus 300 via the drop port 7. In this fashion, channels entering at the add port 8 are directed by the apparatus 300 directly to the drop port 7.

Figure 5:
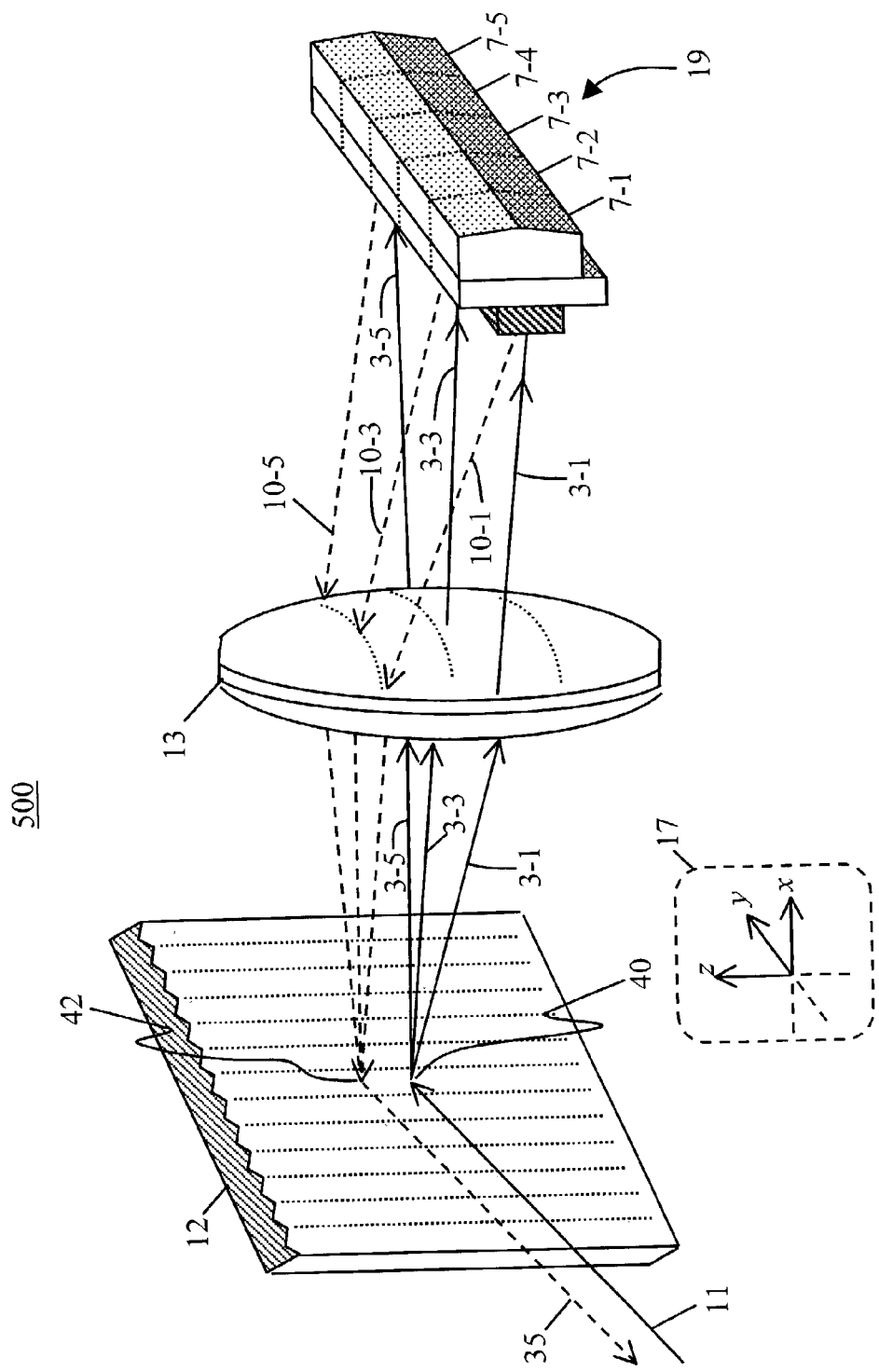
FIG. 5 is an illustration of a second 1×2 wavelength selective switch showing the pathways of a first set of optical channels to a first output.

FIG. 5 is an illustration of a second 1×2 wavelength selective switch showing the pathways of a first set of optical channels to a first output. The 1×2 wavelength selective switch 500 shown in FIG. 5, which is also disclosed in the aforementioned co-pending U.S. patent application with Ser. No. 09/794,590, is similar to the switch 1 shown in FIGS. 2A–2B except that the previously described micro-mirror array reflective apparatus 18 is replaced by a polarization steering device 19. The polarization steering device comprises no moving parts and, instead, comprises a plurality of individually controlled "pixels" 7-1 through 7-5, such that each pixel routes a respective channel according to its polarization.

Figure 6:
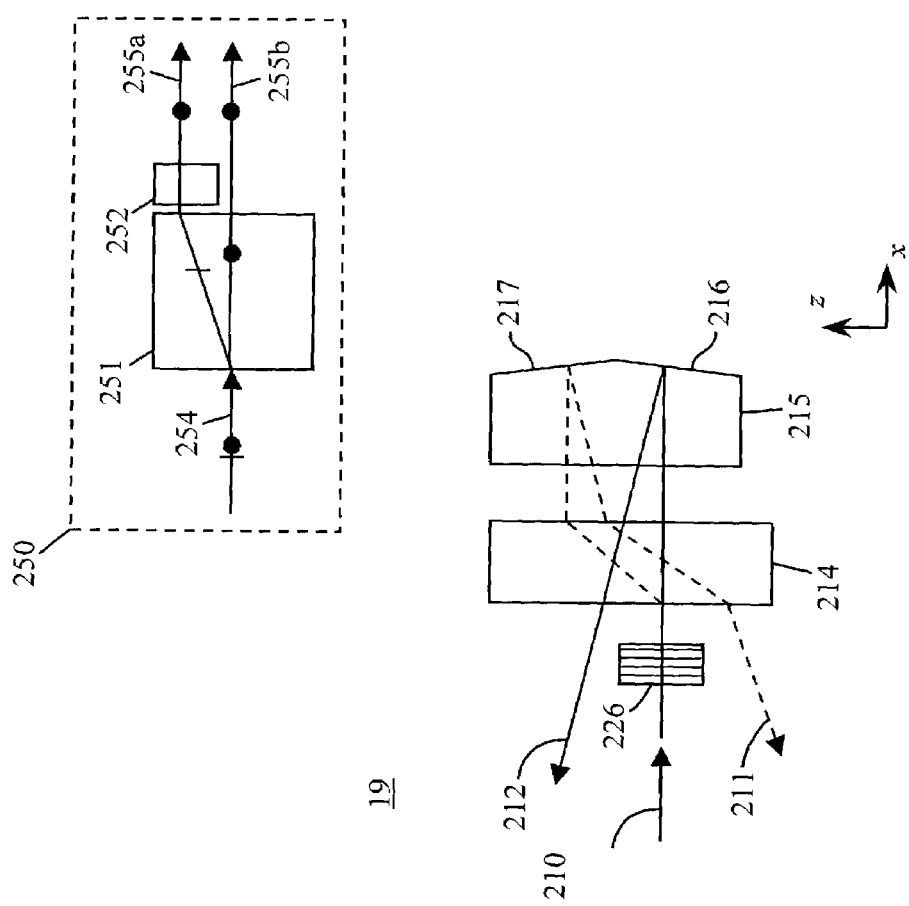
FIG. 6 is a diagram of a beam steering component utilized within the 1×2 wavelength selective switch of FIG. 5.

FIG. 6 shows, in greater detail, a cross section through the polarization steering device 19 within the x-z plane so as to illustrate an individual "pixel" comprising the polarization steering device 19. The polarization steering device 19 includes a polarization modulator 226, a birefringent polarization beam displacer 214 and an angled reflector 215. The polarization modulator 226 can be a magneto-optical device, a liquid crystal device, or other polarization modulator that can rotate polarization of incident beams. The birefringent polarization beam displacer 214 is a planar parallel uni-axial crystal plate with its optic axis inclined in the x-z plane. The angled reflector 215 has two reflective surfaces 216 and 217.

After passing through the polarization modulator 226 (FIG. 6), the incident beam 210 becomes polarized parallel to either the y or z axis depending on a control signal sent to the polarization modulator 226. If the beam after the modulator 226 is polarized in the y-axis, it is not displaced by the beam displacer 214. In this case the beam will be reflected by surface 216 forming returned beam 212. On the other hand, if after passing through the polarization modulator, the beam becomes polarized in the z-direction, the beam will be displaced by beam displacer 214 with a vector component of the displacement along the z-direction. Because of the displacement, the beam will be reflected by surface 217, which makes an angle from surface 216. The returned beam 211 thus will propagate in a direction significantly different from beam 212. The required displacement of beam displacer 214 is on the order of the beam size at the reflecting surfaces. In case the incident beam 210 is focused on the reflecting surfaces 216–217, the required displacement can be fairly small. Because displacement is linearly proportional to the thickness of the beam displacer 214, this means a very thin beam displacer will be sufficient.

In order to direct different wavelength channels into different output ports, the polarization modulator 226 is pixelized in the z direction. In other words, the polarization steering device 19 comprises a plurality of devices or "pixels" 7-1, 7-2, 7-3, 7-4 and 7-5 similar to those shown in FIG. 6, wherein the separate devices are disposed along a line or curve in extending into or out of the plane of the drawing of FIG. 6. Each such separate pixel or individual segment of the polarization modulator 226 defines a pixel or individual element of the polarization steering device 19. The single beam displacer 214 and angled reflector 215 can suffice for all such pixels of the polarization steering device 19. However, a different pixel of the polarization modulator 226 is generally required for each respective pixel of the polarization steering device 19. The polarization steering device 19 can replace the micro-mirror array reflective apparatus 18 in FIGS. 2A–2B. The input beam 210 will be focused onto the two mirror surfaces 216 and 217. Because the polarization steering device 19 can be fairly thin, defocus effects at the polarization modulator 226 may be negligible.

Although the input beam 11 and the wavelength-separated input components 3-1 through 3-5 are assumed to be linearly polarized in the apparatus 500, the invention can easily handle arbitrarily polarized and unpolarized input beams. As shown in the inset 250 in FIG. 6, an arbitrarily polarized or unpolarized beam 254 can be separated into two parallel beams 255a–255b with a birefringent beam displacer 251. After the beam displacer 251, a half-wave plate 252 is inserted into one of the beams to rotate the polarization by 90 degrees. The output beams are thus both linearly polarized parallel to one another. Using this device 250 in the input and output beams, the embodiments using polarization steering devices 19 become polarization independent.

Figure 7:
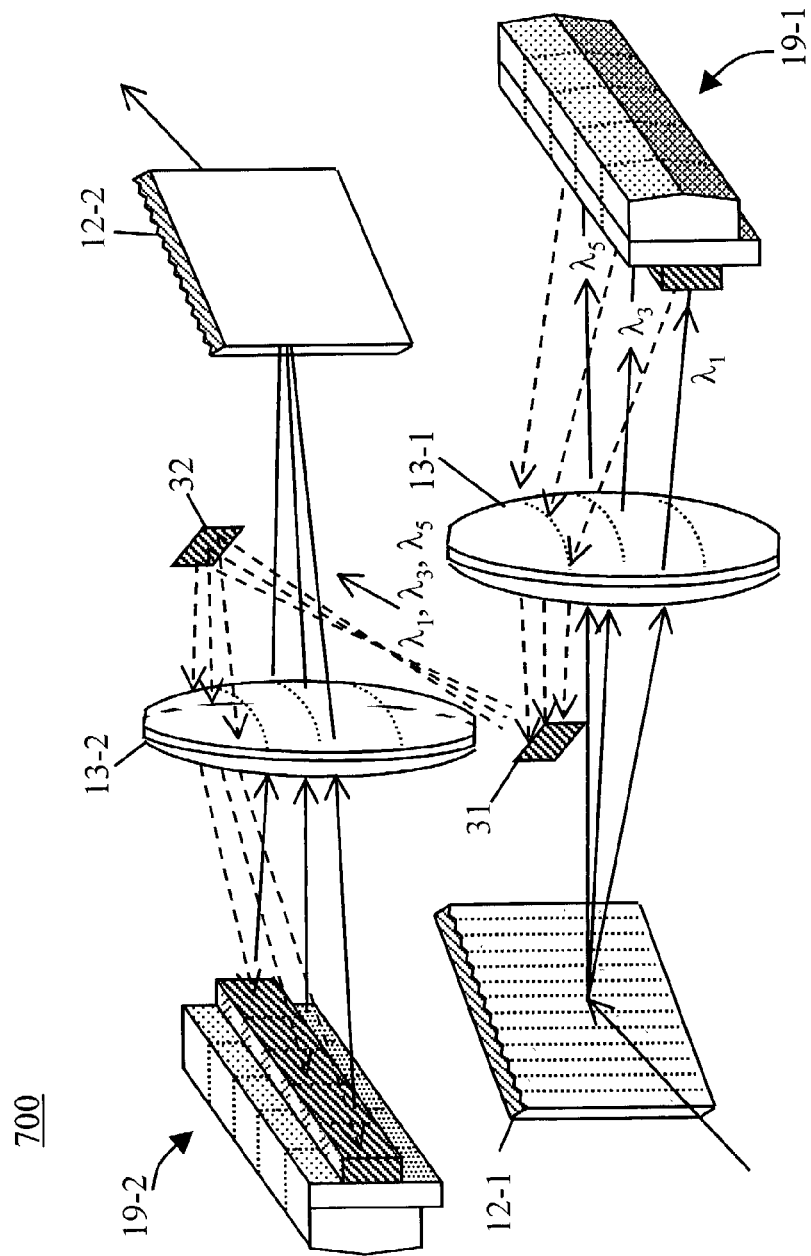
FIG. 7 is a diagram of a second preferred embodiment of a wavelength-selective optical add-drop switch in accordance with the present invention.

FIG. 7 is a diagram of a second preferred embodiment of a wavelength-selective optical add-drop switch in accordance with the present invention. The wavelength-selective optical add-drop switch 700 shown in FIG. 7 routes the express, dropped and added channels similarly to the routing previously described in conjunction with the wavelength-selective optical add-drop switch 300 shown in FIGS. 3A–3C. However, the wavelength-selective optical add-drop switch 700 utilizes the 1×2 wavelength selective switches 500 shown in FIG. 5, wherein polarization steering devices 19-1 and 19-2 are utilized instead of micro-mirror array reflective apparatuses.

An improved wavelength-selective optical add-drop switch has been disclosed. The add-drop wavelength switch comprises a first and a second 1×2 wavelength switch optically coupled to one another via at least one mirror. Each of the first and second 1×2 wavelength switches comprises a switch input and two switch outputs, a wavelength dispersive medium optically coupled to the switch input and the two switch outputs, a lens optically coupled to the wavelength dispersive medium and a segmented beam steering apparatus optically coupled to the lens opposite to the wavelength dispersive medium. The add-drop wavelength switch has a high extinction ratio and low loss.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical add-drop switch, comprising:
   a first switch, comprising:
      a first wavelength dispersive medium,
      a first lens optically coupled to the first wavelength dispersive medium,
      a first segmented beam steering device optically coupled to the first lens at a side opposite to the first wavelength dispersive medium, wherein each segment is independently configured, and
      a first mirror optically coupled to the first lens at a side opposite to the first segmented beam steering device; and
   a second switch comprising:
      a second wavelength dispersive medium,
      a second lens optically coupled to the second wavelength dispersive medium,
      a second segmented beam steering device optically coupled to the second lens at a side opposite to the second wavelength dispersive medium, wherein each segment is independently configured, and
      a second mirror optically coupled to the first mirror and optically coupled to the second lens at a side opposite to the second segmented beam steering device.

2. The switch of claim 1, wherein the first segmented beam steering device comprises a plurality of independently moveable reflective elements, wherein each reflective element reflects a corresponding channel of a composite optical signal.

3. The switch of claim 1, wherein the second segmented beam steering device comprises a plurality of independently moveable reflective elements, wherein each reflective element reflects a corresponding channel of a composite optical signal.

4. The switch of claim 1, wherein the first segmented beam steering device comprises a plurality of polarization steering devices, wherein each polarization steering device reflects a corresponding channel of a composite optical signal, wherein each polarization steering device comprises:
   a polarization modulator optically coupled to the first lens at a side opposite to the first wavelength dispersive medium;
   a birefringent polarization beam displacer optically coupled to the polarization modulator at a side opposite to the first lens; and
   an angled reflector optically coupled to the birefringent polarization beam displacer at a side opposite to the polarization modulator, wherein the angled reflector comprises a first reflective surface and a second reflective surface, wherein a channel is reflected by the first reflective surface when the polarization modulator is in a first state, wherein the channel is reflective by the second reflective surface when the polarization modulator is in a second state.

5. The switch of claim 1, wherein the wavelength dispersive medium comprises a diffraction grating.

6. The switch of claim 1, wherein the wavelength dispersive medium comprises a prism.

7. The switch of claim 1, further comprising:
   a first port optically coupled to the first wavelength dispersive medium;
   a drop port optically coupled to the first wavelength dispersive medium;
   a second port optically coupled to the second wavelength dispersive medium; and
   an add port optically coupled to the second wavelength dispersive medium.

8. The switch of claim 1, wherein an optical path in the first switch is defined from the first wavelength dispersive medium, through the first lens, to the first segmented beam steering device.

9. A method for adding and dropping channels of a composite optical signal, comprising the steps of:
   (a) receiving a composite optical signal at a first port, the composite optical signal comprising a plurality of channels;
   (b) spatially separating the plurality of channels of the composite optical signal by a first wavelength dispersive medium;
   (c) focusing each channel onto a corresponding segment of a first segmented beam steering device, wherein each segment of the first segmented beam steering device is independently configured;
   (d) directing and focusing one or more channels to a corresponding segment of a second segmented beam steering device, and directing each remaining channel to a drop port along a path that does not include the second segmented beam steering device, wherein the directing is based upon a configuration of each corresponding segment of the first segmented beam steering device;
   (e) receiving additional channels at an add port;
   (f) directing the remaining channels and the additional channels to a same location of a second wavelength dispersive medium; and
   (g) multiplexing the remaining channels and the additional channels by the second wavelength dispersive medium.

* * * * *